United States Patent [19]

Mohri et al.

[11] Patent Number: 5,332,779
[45] Date of Patent: Jul. 26, 1994

[54] POLYMERIZABLE SILICA SOL, ADAMANTANE DERIVATIVE FOR USE IN THE SOL AND CURED RESIN PREPARED USING THE SAME

[75] Inventors: Taizo Mohri; Katsuhiko Takagi; Yoshihiro Naruse, all of Chiba; Yukio Asami, Tokyo, all of Japan

[73] Assignee: Kawasaki Steel Corporation, Japan

[21] Appl. No.: 708,699

[22] Filed: May 31, 1991

[30] Foreign Application Priority Data

Jun. 4, 1990 [JP] Japan .................................. 2-145993
Jun. 18, 1990 [JP] Japan .................................. 2-159489
Jun. 18, 1990 [JP] Japan .................................. 2-159490
Jun. 18, 1990 [JP] Japan .................................. 2-159491

[51] Int. Cl.$^5$ ................................................ C08K 3/34
[52] U.S. Cl. ..................................... 524/790; 524/789; 524/492; 524/493; 524/847; 524/858
[58] Field of Search ............... 524/789, 790, 492, 493, 524/847, 858

[56] References Cited

U.S. PATENT DOCUMENTS 4,734,452 3/1988 Hashimoto et al. ............ 524/789 X
4,772,660 9/1988 Kitamura et al. ............... 524/789 X
5,013,788 5/1991 Nagashima et al. ............. 524/789 X

FOREIGN PATENT DOCUMENTS 0059528 9/1982 European Pat. Off. .
0220026 4/1987 European Pat. Off. .
46-28419 8/1971 Japan .
9126594 4/1973 Japan .
9071316 10/1982 Japan .
63-22205 5/1988 Japan .
2064138 8/1988 Japan .
3305176 12/1988 Japan .

OTHER PUBLICATIONS

Derwent Japanese Abstrac Kokai No. 2-64138.

Primary Examiner—Judy M. Reddick
Attorney, Agent, or Firm—Bierman and Muserlian

[57] ABSTRACT

This invention provides polymerizable silica sols in which at least one monomer containing double bond is used as its dispersion medium, especially a silica sol in which the monomer containing double bond is a monomer containing double bond and OH group or is a monomer having an adamantane structure. This invention also provides compositions which comprise these silica sols as composing elements, cured resins that are obtained by polymerizing these silica sols alone or together with other copolymerizable components, and new adamantane derivatives for use in these silica sols.

29 Claims, 1 Drawing Sheet

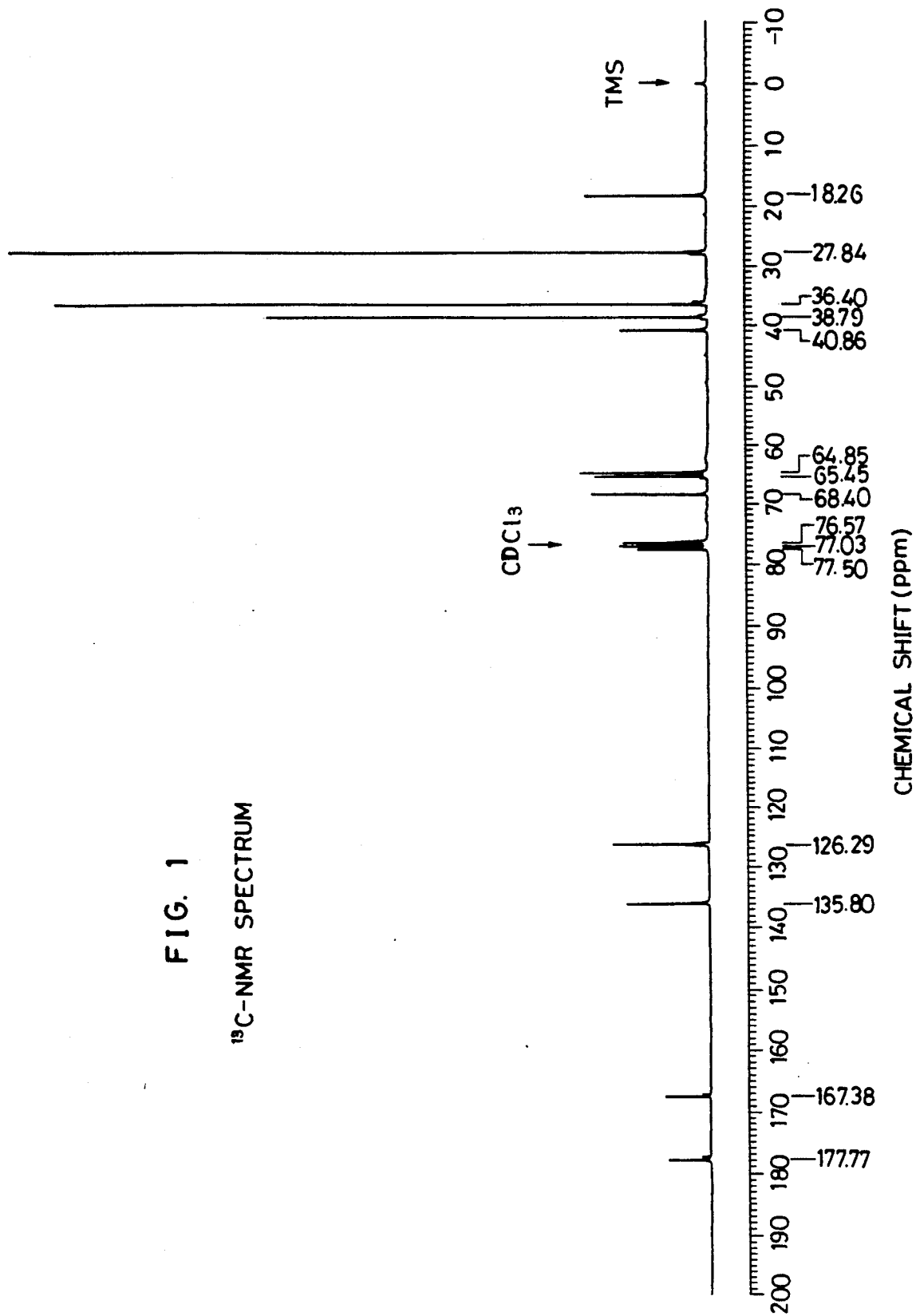

POLYMERIZABLE SILICA SOL, ADAMANTANE DERIVATIVE FOR USE IN THE SOL AND CURED RESIN PREPARED USING THE SAME

FIELD OF THE INVENTION

This invention relates to a novel polymerizable silica sol. The silica sol of this invention, which is characterized in that its dispersion medium is capable of undergoing polymerization, can be applied to various reaction systems and used as materials for the production of high-performance materials.

This invention also relates to a novel adamantane derivative which can be used in the polymerizable silica sol, and to a cured resin produced by using the polymerizable silica sol. The cured resin of this invention has excellent water resistance, abrasion resistance and the like, and can be made into a resin having excellent optical properties by introducing an adamantane structure into the cured resin.

BACKGROUND OF THE INVENTION

Addition of silica powder, colloidal silica or the like to organic resin compositions is widely known as a means to improve abrasion resistance, staining resistance, solvent resistance, water resistance and the like of cured resins.

Aqueous colloidal silica in which water is used as its dispersion medium may be used for the production of a colloidal silica-containing organic resin composition, but other forms of colloidal silica in which dispersion media other than water are used (what is called organosilica sol) may be used more preferably because such organosilica sol has high compatibility with various components in the organic resin composition in many cases.

Every type of the prior art organosilica sol is produced by merely using an organic solvent as its dispersion medium. Japanese Patent Application Kokai No. 63-305176 discloses that, by coating such an organic resin composition containing the organosilica sol on a transparent plastic or glass base, a cured resin suitable for optical purposes can be obtained because of the composition's ability to improve abrasion resistance, dyeaffinity and the like of the resin.

However, such organosilica sol which is prepared by merely replacing its dispersion medium with an organic solvent cannot be used in a solvent-free reaction system (bulk-polymerization), because the organic solvent is generally distilled off after the addition of the organosilica sol to a monomer system for resin use or to a resin composition. In addition, the organosilica sol is apt to undergo an influence of compatibility of its dispersion medium with other components in a resin composition, thus easily resulting in the flocculation of silica particles.

Recently, new techniques for the dispersion of silica particles in dispersion medium other than water have been developed, in which the surface of colloidal silica particles is reformed with organic compounds beforehand.

For example, Japanese Patent Application Kokai No. 49-126594 discloses a process for the production of an organosilica sol in which aqueous colloidal silica is esterified with a water soluble alcohol and the thus esterified silica sol is again subjected to esterification with another alcohol which is hardly soluble in water. Also, Japanese Patent Application Kokai No. 2-64138 discloses a polymerizable silica sol which is produced by firstly reacting aqueous colloidal silica with an alkoxysilane compound having polymerizable unsaturated double bonds to introduce the polymerizable unsaturated double bonds to the water dispersion type colloidal silica particles and then replacing the dispersion medium with an organic solvent.

A number of techniques have been developed for the incorporation of silica into a cured resin as a component of the resin, by allowing colloidal silica to react with an organic resin composition during its curing step.

For example, Japanese Patent Application Kokai No. 53-11951 discloses a process for the production of an organic resin material for industrial use having proper hardness, non-combustibility and the like, which is produced by copolymerization of an alkyl silicate with an organic polymer containing hydroxyl and carboxyl groups in its molecule, especially with an acrylic copolymer. Also, Japanese Patent Application Kokai No. 59-71316 discloses a coating composition useful for the formation of a film having excellent durability and staining resistance, which comprises a resin as its main component obtained by copolymerizing colloidal silica with an $\alpha,\beta$-monoethylenic unsaturated carboxylic acid alkyl ester or the like and with a silane-based monomer compound (silane coupling agent). According to the aforementioned Japanese Patent Application Kokai No. 2-64138, a curable composition for coating use is disclosed which comprises the polymerizable silica sol prepared in the aforementioned manner and a monomer containing other polymerizable unsaturated double bond and which forms a cured film having excellent abrasion resistance and solvent resistance when cured by means of ultraviolet rays, electron beam or the like.

It is known that a polymer having excellent heat resistance, water resistance and optical properties can be obtained by polymerizing a (meth)acrylate having an adamantane structure, alone or with other acrylate monomers. The following describes examples of (meth)acrylate monomers having the adamantane structure.

According to Japanese Patent Publication No. 46-28419, an adamantane mono (meth) acrylate represented by the following general formula

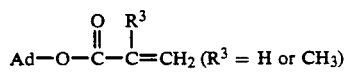

is produced from adamantane monool and (meth)acrylic acid. A polymer or a copolymer is obtained from this adamantane mono(meth)acrylate by its polymerization with the aid of a radical initiator or light exposure.

Also, In Japanese Patent Publication No. 63-22205, a diallylester derived from an adamantane carboxylate is disclosed.

Polymers prepared from these prior art adamantane mono(meth)acrylate and diallylester have excellent heat resistance and optical properties. These polymers, however, have disadvantages such as poor workability due to their excessive hardness and poor adhesion ability to other materials.

Because of these reasons, development of new derivatives having an adamantane structure have been called for in the related fields. In addition, virtually nothing is known about a silica sol in which a (meth)acrylate derivative or the like having an adamantane structure is used as dispersion medium.

SUMMARY OF THE INVENTION

An object of the present invention is to provide a novel polymerizable silica sol which does not contain organic solvents and can be used even for bulk-polymerization, wherein at least a part of its dispersed phase is colloidal silica and its dispersion medium is a double bond containing monomer.

Another object of the present invention is to provide a cured resin having excellent water resistance and abrasion resistance which contains a silica-originated portion in its chemical configuration, as well as a cured resin having an adamantane structure, which shows a low shrinkability at the time of polymerization and has excellent optical properties.

According to a first embodiment of the present invention, there is provided a silica sol which comprises at least one monomer compound containing double bond, and silica dispersed in the monomer compound in a colloidal form. This silica sol may preferably be obtained by replacing dispersion medium of colloidal silica by at least one monomer compound containing double bond.

According to a second embodiment of the present invention, there is provided a silica sol which comprises at least one monomer compound containing double bond and OH group, and silica dispersed in the monomer compound in a colloidal form. Preferably, this silica sol may comprise at least one double bond containing monomer compound as dispersion medium, and a reaction product of at least one monomer containing double bond and OH group with colloidal silica as dispersed phase. The silica sol according to the second embodiment of the present invention may preferably be obtained by allowing colloidal silica to react with at least one monomer compound containing double bond and OH group, and by replacing dispersion medium with at least one monomer compound containing double bond.

According to a third embodiment of the present invention, there is provided a silica sol which comprises a monomer compound containing double bond and having at least one adamantane structure, and silica dispersed in the monomer compound in a colloidal form. Novel adamantane derivative of the present invention may be used in the silica sol of the third embodiment of the present invention.

According to a fourth embodiment of the present invention, there is provided a silica sol which comprises at least one monomer compound containing double bond, and at least one silane coupling agent containing double bond and colloidal silica both dispersed in the monomer compound in a colloidal form. The silica sol according to the fourth embodiment of the present invention may preferably be obtained by allowing colloidal silica to react with at least one silane coupling agent containing double bond, and by replacing dispersion medium by at least one monomer compound containing double bond.

Preferably, colloidal silica contained in the silica sol of the present invention may have a particle size of less than or equal to 50 nm.

Since the silica sol of the present invention does not contain organic solvent, it can be used as a bulk-polymerizable silica-containing monomer, as it is or as a mixture with other double bond containing monomer. The silica sol can be used also as monomers for solution polymerization, suspension polymerization and emulsion polymerization, by mixing it with various additives, dispersing agents, water, solvents and the like.

According to the fifth embodiment of the present invention, there is provided a composition for cured resin which comprises the silica sol of the present invention and an polymerization initiator.

According to the sixth embodiment of the present invention, there is provided a cured resin which is obtained by curing the silica sol of the present invention.

BRIEF DESCRIPTION OF THE DRAWING

FIG. 1 is a chart showing 13C-NMR spectrum of a novel adamantane derivative obtained in Example 3.

DETAILED DESCRIPTION OF THE INVENTION

According to first, second, third and fourth embodiments of the present invention, monomer compounds containing double bond are used as the dispersion medium of the inventive silica sol. The following illustrates examples of such monomer compounds.

(1) Monomers based on acrylic acid

This type of monomers include: acrylic acid and methacrylic acid; monofunctional (meth)acrylic esters such as methyl acrylate, ethyl acrylate, n-butyl acrylate, 2-ethylhexyl acrylate, lauryl acrylate, methyl methacrylate, ethyl methacrylate, n-butyl methacrylate, 2-ethylhexyl methacrylate, lauryl methacrylate, glycidyl methacrylate, 2-hydroxyethyl acrylate, 2-hydroxyethyl methacrylate, 2-hydroxypropyl acrylate, 2-hydroxypropyl methacrylate, 2-hydroxy-1-methylethyl acrylate, 2-hydroxy-1-methylethyl methacrylate, 2-hydroxy-3-chloropropyl methacrylate and the like; and multifunctional (meth)acrylates such as ethylene glycol diacrylate, diethylene glycol diacrylate, triethylene glycol diacrylate, 1,6-hexanediol diacrylate, trimethylolpropane triacrylate, bishydroxyethylene bisphenol A diacrylate, bishydroxypropylene bisphenol A diacrylate, polyethylene glycol diacrylate, propylene glycol diacrylate, dipropylene glycol diacrylate, tripropylene glycol diacrylate, polypropylene glycol diacrylate, polyester diacrylate, polyester polyacrylate, 1,3-butylene glycol diacrylate, 1,4-butylene glycol diacrylate, tetramethylolmethane triacrylate, tetramethylolmethane tetraacrylate, ethylene glycol dimethacrylate, diethylene glycol dimethacrylate, triethylene glycol dimethacrylate, 1,6-hexanediol dimethacrylate, trimethylolpropane trimethacrylate, bishydroxyethylene bisphenol A dimethacrylate, bishydroxypropylene bisphenol A dimethacrylate, polyethylene glycol dimethacrylate, propylene glycol dimethacrylate, dipropylene glycol dimethacrylate, tripropylene glycol dimethacrylate, polypropylene glycol dimethacrylate, polyester dimethacrylate, polyester polymethacrylate, 1,3-butylene glycol dimethacrylate, 1,4-butylene glycol dimethacrylate, tetramethylolmethane trimethacrylate, tetramethylolmethane tetramethacrylate and the like.

(2) Monomers having adamantane structure

Illustrative examples of such monomers include compounds represented by the following general formulae (I) to (IV).

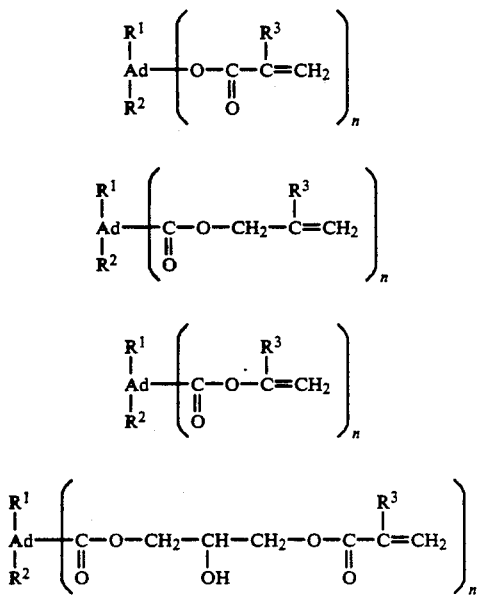

wherein Ad ms an adamantane group, $R^1$ and $R^2$ are hydrogen atom or a methyl group or an ethyl group, $R^3$ is hydrogen atom or a methyl group and n is an integer of 1 or 2.

(3) Alkenyl benzenes

Illustrative examples of such compounds include styrene, α-methylstyrene, vinyltoluene and the like.

(4) Silane-based monomers

Illustrative examples of such compounds include divinyl dimethoxy silane, divinyl bis-β-methoxy-ethoxy silane, vinyl triethoxy silane, vinyl tris-β-methoxy-ethoxy silane, γ-methacryloxypropyltrimethoxy silane and the like.

Among these monomers containing double bond, (meth) acrylate-based monomers, especially 2-hydroxyethyl acrylate, 2-hydroxypropyl methacrylate, methyl methacrylate and the like, and the monomers having adamantane structure represented by the above general formulae (I) to (IV) may be used preferably. These monomers may be used alone or as a mixture of two or more.

Adamantane mono (meth)acrylate, a compound represented by the aforementioned general formula (I), has been disclosed in Japanese Patent Publication No. 46-28419 with regard to a process for its production from adamantane monool and (meth)acrylic acid. Also, adamantane carboxylate diallyl ester which is one of the compounds represented by the general formula (II) has been disclosed in Japanese Patent Publication No. 63-22205.

Compounds represented by the aforementioned general formula (IV) are novel adamantane derivatives.

These new adamantane derivatives can be prepared by introducing a side chain having at least one hydroxyl group and at least one acryloyl or methacryloyl group into adamantane or alkyl adamantane.

The cured products obtained from the novel adamantane derivatives having OH groups of the present invention have flexibility and excellent adhesive ability to other materials. By taking advantage of these properties, the adamantane derivatives can be applied to main components of pretreating agents such as antireflection and hard coat treatments for an optical desk, an optical lens and the like.

Furthermore, adding these adamantane derivatives to over coat films such as antireflection films, hard coat films, antistatic films and the like can improve their dye-affinity. OH groups of adamantane derivatives also improve their antistatic capacity.

Preferably, these compounds represented by the general formula (IV) of the present invention may be obtained by allowing glycidyl acrylate or glycidyl methacrylate to react with a carboxylate of adamantanes, such as 1-carboxyadamantane, 1,3-dicarboxyadamantane, 1-ethyl-3-carboxyadamantane, 1-ethyl-3,5-dicarboxyadamantane, 1,3-dimethyl-5-carboxyadamantane or 1,3-dimethyl-5 7-dicarboxyadamantane.

Though the use of glycidyl acrylate has advantages of high photopolymerization ability and quick hardening, glycidyl methacrylate is used more commonly because of the difficulty in producing and handling the former compound.

Though not strictly limited, the reaction of carboxyadamantanes with glycidyl (meth)acrylate may preferably be carried out at a temperature of from 80° to 170° C. for 2 to 20 hours in the presence or absence of a solvent.

with regard to the solvent, aromatic hydrocarbons such as xylene, toluene and the like or aliphatic hydrocarbons such as heptane, octane and the like may be used preferably. The reaction may be completed even in the absence of a catalyst, but, if necessary, quaternary ammonium salts such as tetraethylammonium bromide or tertiary amines such as dimethylbenzylamine, triethylamine and the like may be used preferably.

To properly extend the side chain portion linked to an adamantane structure and to introduce a hydroxyl group into the chain can provide a polymer or a copolymer which has the novel adamantane derivative of the present invention as a monomer component. The adamantane derivative gives the polymer or the copolymer high flexibility and reactivity with other component or adhesive ability to other materials, taking advantage of its low shrinkability during polymerization step.

The dispersed phase of the silica sol in accordance with the second embodiment of the present invention is a reaction product of colloidal silica with at least one monomer compound containing double bond and OH group. Illustrative examples of monomers containing double bond and OH group include: (meth)acrylate based monomers containing OH group such as 2-hydroxyethyl acrylate, 2-hydroxypropyl acrylate, 2-hydroxyethyl methacrylate, 2-hydroxypropyl methacrylate, 2-hydroxy-1-methylethyl acrylate, 2-hydroxy-1-methylethyl methacrylate, 2-hydroxy-3-chloropropyl methacrylate and the like; and adamantane derivatives represented by the aforementioned general formula (IV). At least one of these monomers may be used for the second embodiment of this invention.

Among these monomers containing double bond and OH group, 2-hydroxyethyl acrylate, 2-hydroxyethyl methacrylate, 2-hydroxypropyl methacrylate and the adamantane derivatives represented by the general formula (IV) may be used most preferably. A reaction product of colloidal silica with a monomer compound containing double bond and OH group may be obtained by mixing these materials and then heating the mixture. During such a reaction step, a portion of silanol groups on the surface of colloidal silica particles react with OH groups in the molecules of the monomer compound containing double bond and OH group and, as the results, double bonds are introduced into colloidal silica particles by means of chemical bonding. Silica particles dispersed in an alcohol or cellosolve or the like in a colloidal form may be used preferably as the starting material for the formation of a reaction product of colloidal silica and a monomer compound containing double bond and OH group. A reason for such a preference is that the use of a water-based colloidal silica as the starting material sometimes causes gelation, because such a monomer compound generally has poor compatibility with water.

It is not necessary to allow all silanol groups on the surface of the colloidal silica particles to react with a monomer compound containing double bond. In consequence, the dispersed phase of the silica sol in accordance with the second embodiment of the present invention may be a compound formed by the reaction of silanol groups on the surface of colloidal silica particles with OH groups in molecules of a monomer compound containing double bond and OH group or may be a mixture of such a compound with an unreacted silicon-based compound which is formed when silica as a basic component is dispersed in a colloidal form. In this instance, unreacted portion of the monomer compound containing double bond and OH group acts as dispersion medium.

The silica sol according to a third embodiment of the present invention comprises a monomer compound containing double bond and having at least one adamantane structure represented by the general formulae (I) to (IV), and silica dispersed in the monomer compound in a colloidal form.

As the dispersion medium of the silica sol according to the second and third embodiments of the invention, a monomer compound containing both double bond and OH group may be used alone or together with another monomer compound which does not contain OH group but double bond, the latter compound being selected from the monomers listed above.

The dispersed phase of the silica sol of the present invention is a silicon-based compound which is formed when silica ($SiO_2$) as the basic unit is dispersed in a colloidal form. Preferably, the silica sol of the present invention may be obtained by replacing dispersion medium of colloidal silica with at least one monomer compound containing double bond. In such an instance, the colloidal silica used as a starting material may preferably be a silica sol containing an alcohol or a cellosolve as dispersion medium. A monomer compound containing double bond generally has low compatibility with water. Consequently, when the silica sol of the present invention is prepared using a water-based colloidal silica as the starting material, silica particles are hardly transferred from water into the monomer compound containing double bond and the product sometimes becomes gel. On the contrary, the silica sol of the present invention in which a monomer compound containing double bond is used as dispersion medium can be obtained easily, when colloidal silica dispersed in an alcohol or cellosolve which has relatively high compatibility with the monomer compound containing double bond is used as the starting material.

Silica particles suitable for use in the present invention may have a particle size of less than or equal to 50 nm, preferably less than or equal to 30 nm. Silica particles with particle size of larger than 50 nm would give a silica sol inferior transparency and, as the results, a cured resin produced from such silica sol would have a low transparency and therefore could not be suitable for optical purpose. It is preferable to use silica particles having a size of less than or equal to 30 nm in order that the silica sol is applied to precision optical materials and the like. A metal sol such as antimony oxide which has a particle size of less than and equal to 50 nm and can be dispersed stably in solvents including water, an alcohol, toluene and the like may be used instead of or together with colloidal silica. For the purpose of obtaining a cured resin having appropriate properties, silica particles may be contained in a silica sol in an amount from 1 to 50% by weight, preferably from 3 to 30% by weight.

In a preferred process for the preparation of the silica sol according to the first embodiment of the present invention, silica particles dispersed in an alcohol or cellosolve in a colloidal form are used as the starting material. The colloidal silica particles are firstly mixed with a monomer compound containing double bond and then the alcohol or cellosolve is distilled off from the mixture by heating. In some cases, dispersion medium of the silica sol of the present invention obtained by such a process is contaminated by a small amount of the used alcohol or cellosolve. Such a contaminated silica sol is also included in the silica sol of the present invention.

Preferably, the silica sol in accordance with the second embodiment of the present invention may be obtained by allowing colloidal silica to react with at least one monomer compound containing double bond and OH group, and by replacing dispersion medium with at least one monomer compound containing double bond.

Reaction of colloidal silica with a monomer compound containing double bond and OH group may be carried out either before or after the replacement of dispersion medium. The reaction of colloidal silica with such a monomer compound may also be carried out simultaneously with the replacement step of dispersion medium. The reaction of colloidal silica with a monomer compound containing double bond and OH group may be effected by mixing these materials and then heating the mixture, and replacement of dispersion medium may be achieved by distilling off the dispersion medium (an alcohol, cellosolve and the like) from the colloidal silica material by heating the mixture of these materials.

The process for the preparation of the silica sol according to the third embodiment of the present invention may be selected preferably from the processes of the first and the second embodiments of the present invention.

According to the fourth embodiment of the present invention, the silica sol according to the first, the second, or the third embodiment of the present invention further contains at least one silane coupling agent having double bond. Illustrative examples of the double bond containing silane coupling agent include: compounds having vinyl group such as vinyltrimethoxysilane, vinyltriethoxysilane, vinyltripropoxysilane, vinyltributoxysilane, vinylmethyldimethoxysilane, vinylmethyldiethoxysilane, vinylmethyldipropoxysilane, vinylmethyldibutoxysilane, vinyldimethylmonomethoxysilane, vinyldimethylmonoethoxysilane, vinyldimethylmonopropoxysilane, vinyldimethylmonobutoxysilane, vinylphenyldimethoxysilane, vinylphenyldiethoxysilane, vinylphenyldipropoxysilane, vinylphenyldibutoxysilane, vinyldiphenylmonomethoxysilane, vinyldiphenylmonoethoxysilane, vinyldiphenylmonopropoxysilane, vinyldiphenylmonobutoxysilane and the like; and compounds having γ-acryloyl group or γ-methacryloyl group such as γ-(meth)acryloxypropyltrimethoxysilane, γ-(meth)acryloxypropyltriethoxysilane, γ-(meth)acryloxypropyltripropoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxypropylmethyldibutoxysilane, γ-(meth)acryloxypropylphenyldimethoxysilane, γ-(meth)acryloxypropylphenyldiethoxysilane, γ-(meth)acryloxypropylphenyldipropoxysilane, γ-(meth)acryloxypropylphenyldibutoxysilane, γ-(meth)acryloxyethyltrimethoxysilane, γ-(meth)acryloxyethyltriethoxysilane, γ-(meth)acryloxyethyltripropoxysilane, γ-(meth)acryloxyethyltributoxysilane, γ-(meth)acryloxyethylmethyldimethoxysilane, γ-(meth)acryloxyethylmethyldiethoxysilane, γ-(meth)acryloxyethylmethyldipropoxysilane, γ-(meth)acryloxyethylmethyldibutoxysilane, γ-(meth)acryloxyethylphenyldimethoxysilane, γ-(meth)acryloxyethylphenyldiethoxysilane, γ-(meth)acryloxyethylphenyldipropoxysilane, γ-(meth)acryloxyethylphenyldibutoxysilane and the like.

Among these double bond containing silane coupling agents, γ-methacryloxypropyltrimethoxysilane, γ-acryloxypropyltriethoxysilane, vinyltrimethoxysilane and the like may be used preferably.

Preferably, a colloidal silica having an alcohol or cellosolve as a dispersion medium may be used to obtain a reaction product of a double bond containing silane coupling agent with colloidal silica.

Since many sorts of silane coupling agents dissolve in water generally with a solubility of 5% or higher, a water-based colloidal silica can be used as a starting material. However, reaction of the water-based colloidal silica with a silane coupling agent having a large number of carbon atoms sometimes results in gelation because such a coupling agent has inferior compatibility with water. In the case of such a silane coupling agent, it is preferable to use silica particles dispersed in an alcohol or cellosolve in a colloidal form.

A reaction product of a double bond containing silane coupling agent with colloidal silica may be obtained by heating a mixture of these compounds. During such a reaction step, a portion of silanol groups on the surface of the colloidal silica particles react with the double bond containing silane coupling agent, and double bonds are introduced into the colloidal silica particles by chemical bonding. However, it is not necessary to allow all silanol groups on the surface of the colloidal silica particles to react with the coupling agent. In consequence, the dispersed phase of the silica sol according to the fourth embodiment of the present invention may be a compound formed by the reaction of silanol groups on the surface of colloidal silica particles with a double bond containing silane coupling agent or may be a mixture of such a compound with a siliconbased compound which is formed when silica as a basic component is dispersed in a colloidal form.

The reaction of a double bond containing silane coupling agent with colloidal silica may be carried out either before or after the replacement of dispersion medium of the silica sol, but the reaction may preferably be carried out in advance of the replacement step because of a high reactivity of silanol groups on the surface of colloidal silica particles. When a double bond containing silane coupling agent is used as a monomer compound containing double bond, reaction of such a coupling agent with colloidal silica may be carried out simultaneously with the replacement step of dispersion medium.

The silane coupling agent may be used in an amount up to 70% by weight, preferably up to 30% by weight, relative to the weight of solid silica particles in a colloidal silica. Such a range is preferable because the silica particles do not aggregate within the range. Otherwise, aggregation tends to occur.

In addition to the aforementioned essential components, the silica sol of the present invention may further be mixed with stabilizing agents such as ammonia, a low molecular weight amine, a surface active agent and the like. Also, light stabilizers, antioxidant and the like may be added to the silica sol of the present invention, provided that such agents do not spoil characteristics of the inventive silica sol.

The composition according to the fifth embodiment of the present invention comprises the aforementioned silica sol and a polymerization initiator.

Illustrative examples of the initiator include: radical polymerization initiators such as peroxides including benzoyl peroxide, di-t-butyl peroxide and the like and azo-based compounds including azobisisobutyronitrile and the like; and photopolymerization initiators which are effected by ultraviolet rays such as 1- (4-isopropylphenyl) -2-hydroxy-2-methylpropane-1-one, 2-hydroxy-2-methyl-1-phenylpropane-1-one, 2,2-dimethoxy-2-phenylacetophenone, 2-methyl- [4- (methylthio)phenyl]-2-morpholino-1-propanone, 1,4-dibenzoylbenzene, 1,2-diphenylethane-dione, 1-hydroxycyclohexylphenylketone, benzophenone and the like.

The initiator may be used in an amount which is enough to initiate polymerization of the silica sol, but preferably from 0.1 to 10% by weight relative to the composition. In addition to the aforementioned essential components, the composition in accordance with the fifth embodiment of the present invention may be mixed, if necessary, further with various additives such as a pigment, a light stabilizer, an antioxidant, a plasticizer, a pigment dispersant, a thickner, an antiseptic agent, an antifoaming agent and the like. Also, the composition may further include an additional monomer compound containing double bond, which is different from the monomer compound containing double bond used as an essential component of the silica sol.

The cured resin in accordance with the sixth embodiment of the present invention may be produced by any common means, but preferably in the following manner.

The silica sol of the present invention, mixed if necessary with a polymerization initiator, may be subjected to polymerization by any commonly used means such as radical polymerization, heat polymerization and a polymerization with the aid of energy sources such as ultraviolet rays or electric beam. Preferably, the cured resin may be obtained by polymerizing the composition in accordance with the fifth embodiment of the present invention. Also, the cured resin may be obtained by mixing the silica sol of the present invention with a double bond containing monomer compound which is different from the monomer compound containing double bond used as the dispersion medium of the silica sol and, if necessary, with a polymerization initiator, and then subjecting the mixture to a polymerization step.

The amount of silica in the cured resin may be in the range from 1 to 50% by weight, preferably from 3 to 30% by weight. In case of less than 1% by weight, a cured resin would have insufficient water resistance and abrasion resistance. In case of lager than 50% by weight, sufficient mechanical strength and workability would not be obtained.

In the cured resin preparation process to use the silica sol of the second embodiment of the present invention, double bonds are introduced to colloidal silica particles by chemical bonding as a result of the reaction of a portion of silanol groups on the surface of the colloidal silica with OH groups of the monomer compound containing double bond and OH group. The thus introduced double bonds into the silica particles can be polymerized with unreacted (free from the chemical bonding to silica) double bonds of molecules of the monomer compound containing double bond and OH group. Because of such a mode of polymerization, silica particles are uniformly incorporated into copolymer of the thus cured resin as a component of the copolymer and, as the results, the cured resin shows a valuable characteristic, that is, an optical isotropy.

According to the sixth embodiment of the present invention, silica particles are uniformly dispersed in the cured resin because these particles exist as one of the components bonded chemically in the cured resin. The cured resin, therefore, has not only water and abrasion resistances but also optical isotropy, heat resistance and excellent dimensional stability against temperature and humidity changes. According to the six embodiment of the present invention, a cured resin suitable for optical means can be produced, because an adamantane structure is introduced into the cured resin when the cured resin is prepared by using a silica sol in which at least a portion of its dispersion medium is replaced with a monomer compound containing double bond and having an adamantane structure or when it is prepared by using any one of the silica sols in accordance with the first to fifth embodiments of the present invention after mixing the silica sol with a monomer compound containing double bond and having an adamantane structure.

EXAMPLES

The following examples are provided to further illustrate the present invention.

EXAMPLE 1

Preparation of Adamantane Derivative

A three neck flask having about 300 ml capacity equipped with a stirrer, a condenser and a thermometer was charged with 4.5 g of adamantane monocarboxylate and 7.2 g of glycidyl methacrylate together with 86 g of xylene. Temperature of the thus charged contents in the flask was increased using an oil bath to a level at which reflux of xylene started, and the reaction was carried out for 6 hours at the refluxing temperature. When samples of the reaction solution were withdrawn at intervals and applied to gas chromatography, gradual decrease in the amount of adamantane monocarboxylate and glycidyl methacrylate and gradual increase in the amount of an addition compound as the product, represented by the following general formula (V), were observed with the lapse of the reaction time. The yield of the product reached 57% after 6 hours of the reaction.

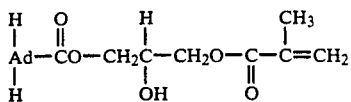

EXAMPLE 2

Preparation of Adamantane Derivative

A three neck flask having about 300 ml capacity equipped with a stirrer, a condenser and a thermometer was charged with 6.8 g of adamantane monocarboxylate, 5.9 g of glycidyl methacrylate and 0.3 g of tetraethylammonium bromide as a reaction catalyst together with 150 g of toluene. After passing N$_2$ gas through the thus charged contents in the flask, temperature of the contents was increased using an oil bath to a level at which reflux of toluene started, and the reaction was carried out for 7 hours at the refluxing temperature. When samples of the reaction solution were withdrawn at intervals and applied to gas chromatography, gradual decrease in the amount of adamantane monocarboxylate and glycidyl methacrylate and gradual increase in the amount of the addition compound as the product [general formula (V)] were observed with the lapse of the reaction time. The yield of the product reached 90% after 7 hours of the reaction. A separating funnel having about 500 ml capacity was charged with the product together with about 100 ml of distilled water and the contents were shaken 10 to 20 times. After-discarding the lower water layer, the product-containing separating funnel was again charged with 100 ml of distilled water and the contents were shaken in the same manner. By repeating the shaking/discarding steps 5 to 6 times, the residue of tetraethylammonium bromide catalyst was removed. Thereafter, toluene solution was distilled by vacuum evaporation to obtain purified light yellow product.

EXAMPLE 3

Preparation of Adamantane Derivative

A three neck flask having about 300 ml capacity equipped with a stirrer, a condenser and a thermometer was charged with 7.0 g of adamantane monocarboxylate, 6.2 g of glycidyl methacrylate and 0.2 g of dimethylbenzylamine as a reaction catalyst together with 180 g of toluene. Temperature of the thus charged contents in the flask was increased using an oil bath to a level at which reflux of toluene started, and the reaction was carried out for 8 hours at the refluxing temperature. When samples of the reaction solution were withdrawn at intervals and applied to gas chromatography, gradual decrease in the amount of adamantane monocarboxylate and glycidyl methacrylate and gradual increase in the amount of the addition compound as the product [general formula (V)] were observed with the lapse of the reaction time. The yield of the product reached 90% after 8 hours of the reaction. Thereafter, toluene and the catalyst were distilled off by vacuum evaporation to obtain purified light yellow product. According to a GPC (gel permeation chromatography) analysis of the product by-products are hardly defected. Results of a $^{13}$C-NMR analysis of the product are shown in FIG. 1. The analysis was conducted by using GX-270 type NMR Spectro Meter manufactured by Nippon Electric Co., Ltd. at the observing frequency of 76.5 MHz.

EXAMPLE 4

Preparation of Silica Sol

A three neck flask having about 300 ml capacity equipped with a stirrer, an outlet for solvent distillation, a condenser and a thermometer was charged with 100 g of a methanol silica sol ($SiO_2$ content, 30%; manufactured by Nissan Chemical Industries, Ltd.) together with 120 g of 2-hydroxyethyl methacrylate. Temperature of the thus charged contents in the flask was increased to a certain level to roughly distill off methanol and then to about 85° C to complete the distillation of methanol. In this way, a silica sol containing silica particles of 20% dispersed in 2-hydroxyethyl methacrylate as the dispersion medium was obtained. The size of silica particles in the thus obtained silica sol was measured to be 10 to 20 nm.

EXAMPLE 5

Preparation of Silica Sol

A three neck flask having about 300 ml capacity equipped with a stirrer, an outlet for solvent distillation, a condenser, a thermometer, a vacuum pump and a manometer was charged with 100 g of an isopropanol silica sol ($SiO_2$ content, 30%; manufactured by Nissan Chemical Industries, Ltd.) together with 120 g of 2-hydroxypropyl methacrylate. Temperature of the thus charged contents in the flask was increased to 45° C. and then pressure in the flask was decreased to about 30 mmHg using the vacuum pump to distill off isopropanol. In this way, a silica sol containing silica particles of 20% dispersed in 2-hydroxypropyl methacrylate as the dispersion medium was obtained. The size of silica particles in the thus obtained silica sol was measured to be 10 to 20 nm.

EXAMPLE 6

Preparation of Silica Sol

A three neck flask having about 300 ml capacity equipped with a stirrer, an outlet for solvent distillation, a condenser and a thermometer was charged with 100 g of a methanol silica sol (SiO2 content, 30%; manufactured by Nissan Chemical Industries, Ltd.) together with 120 g of 2-hydroxypropyl methacrylate. Temperature of the thus charged contents in the flask was increased to a certain level to distill off methanol and then to about 200° C. In this way, a silica sol containing silica particles of 20% dispersed in 2-hydroxypropyl methacrylate as the dispersion medium was obtained, in which a portion of silanol groups on the silica surface were esterified with 2-hydroxypropyl methacrylate. The size of the esterified silica particles in the thus obtained silica sol was measured to be 10 to 20 nm.

EXAMPLE 7

Preparation of Silica Sol

A three neck flask having about 300 ml capacity equipped with a stirrer, an outlet for solvent distillation, a condenser and a thermometer was charged with 100 g of a methanol silica sol ($SiO_2$ content, 30%; manufactured by Nissan Chemical Industries, Ltd.) together with 120 g of 2-hydroxyethyl methacrylate. Temperature of the thus charged contents in the flask was increased to a certain level to roughly distill off methanol and then to about 85° C to complete the distillation of methanol. In this way, a silica sol (a) containing silica particles of 20% dispersed in 2-hydroxyethyl methacrylate as the dispersion medium was obtained. Thereafter, 50 weight parts of the silica sol (a) was mixed with 50 weight parts of 1-adamantyl methacrylate to obtain a silica sol (b) containing silica particles of 10% having a particle size of 30 nm dispersed in 2-hydroxyethyl methacrylate and 1-adamantyl methacrylate the dispersion medium.

EXAMPLE 8

Preparation of Composition For Cured Resin Use

A mixture was prepared from 50 weight parts of the silica sol (b) obtained in Example 7 having an average particle size of 30 nm, 25 weight parts of methyl methacrylate monomer, 20 weight parts of ethyl acrylate monomer, 5 weight parts of methacrylic acid monomer and, as a polymerization initiator, 0.3 weight parts of azobisisobutyronitrile. By dissolving these compounds, a composition containing 5% by weight of silica as effective component was obtained for use in the preparation of a cured resin.

EXAMPLE 9

Preparation of Cured Resin

A cured resin containing adamantane structure and silica particles having a particle size of 30 nm was obtained by heating the composition for cured resin use prepared in Example 8 at 90° C. for 3 hours.

EXAMPLE 10

Preparation of Silica Sol

A three neck flask having about 300 ml capacity equipped with a stirrer, an outlet for solvent distillation, a condenser, a thermometer, a vacuum pump and a manometer was charged with 67 g of an isopropanol silica sol (Si02 content, 30%; particle size, 10 nm; manufactured by Catalysts & Chemicals Industries Co., Ltd. under a trade name of Oscal 1432) together with 10 g of γ-methacryloxypropyl trimethoxysilane. The thus charged contents were stirred for 10 hours at 75° to 80° C. to complete the reaction. The flask was further charged with 100 g of 2-hydroxyethyl methacrylate. Thereafter, keeping temperature of the contents at 45° C., pressure in the flask was reduced to about 30 mmHg using the vacuum pump to distill off isopropanol. In this way, a silica sol containing silica particles having a particle size of 10 nm was obtained, in which the dispersion medium was composed of 2-hydroxyethyl methacrylate and unreacted γ-methacryloxypropyl trimethoxysilane and the dispersed phase, about 20% in total, was composed of silica itself and a reaction product of silica with γ-methacryloxypropyl trimethoxysilane.

EXAMPLE 11

Preparation of Cured Resin

A mixture was prepared from 10 weight parts of the silica sol obtained in Example 10 having an average particle size of 10 nm, 25 weight parts of 1-adamantyl methacrylate, 15 weight parts of ethyl acrylate monomer, 5 weight parts of 2-hydroxyethyl acrylate monomer, 45 weight parts of methacrylic acid monomer and, as a polymerization initiator, 0.3 weight part of azobisisobutyronitrile. By dissolving these compounds and heating the resulting solution at 100° C. for 2 hours, a novel cured resin containing the adamantane structure and silica particles having a particle size of 10 nm was obtained.

EXAMPLE 12

Preparation of Silica Sol

A three neck flask having about 300 ml capacity equipped with a stirrer, an outlet for solvent distillation, a condenser, a thermometer, a vacuum pump and a manometer was charged with 150 g of an isopropanol silica sol ($SiO_2$ content, 20%; particle size, 5 to 10 nm; manufactured by Nissan Chemical Industries, Ltd.) together with 80 g of 2-hydroxypropyl methacrylate and 40 g of the double bond containing monomer compound having an adamantane structure represented by the general formula (V) which has been obtained in Example 2. Thereafter, heating the thus charged contents at 45° C. pressure in the flask was reduced to about 30 mmHg using the vacuum pump to distill off isopropanol. In this way, a silica sol containing silica particles of 20% having a particle size of 5 to 10 nm dispersed in a dispersion medium consisting of 2-hydroxypropyl methacrylate and the monomer having the structure represented by the general formula (V) was obtained.

EXAMPLE 13

Preparation of Cured Resin

A mixture was prepared from 50 weight parts of the silica sol obtained in Example 12 having a particle size of 10 nm, 50 weight parts of ethyl acrylate monomer and, as a polymerization initiator, 0.5 weight parts of azobisisobutyronitrile. By dissolving these compounds and heating the resulting solution at 100° C. for 2 hours, a cured resin containing the novel adamantane structure and silica particles having a particle size of 10 nm was obtained.

EXAMPLE 14

Preparation of Silica Sol

A three neck flask having about 300 ml capacity equipped with a stirrer, an outlet for solvent distillation, a condenser and a thermometer was charged with 100 g of a methanol silica sol ($SiO_2$ content, 30%; particle size, 10 to 20 nm; manufactured by Nissan Chemical Industries, Ltd.) together with 40 g of 2-hydroxypropyl methacrylate and 80 g of the double bond containing monomer compound having the adamantane structure represented by the general formula (V) which has been obtained in Example 3. Thereafter, temperature of the thus charged contents in the flask was increased to a certain level to distill off methanol and then further to about 200° C. In this way, a silica sol containing silica particles of 20% having a particle size of 10 to 20 nm dispersed in 2-hydroxypropyl methacrylate as the dispersion medium was obtained, in which a portion of silanol groups on the surface of silica particles were esterified with both 2-hydroxypropyl methacrylate and the double bond containing monomer having the structure represented by the general formula (V).

EXAMPLE 15

Preparation of Cured Resin

A mixture was prepared from 70 weight parts of the silica sol obtained in Example 14 having a particle size of 10 to 20 nm, 10 weight parts of methyl methacrylate monomer, 20 weight parts of trimethylolpropane triacrylate monomer and, as a photopolymerization initiator, 1.0 weight parts of 1-hydroxycyclohexylphenylketone. By dissolving these compounds and exposing the resulting solution to ultraviolet rays, a cured resin containing the novel adamantane structure and silica having a particle size of 10 to 20 nm was obtained.

Thus, it is apparent that there has been provided, in accordance with the present invention, a novel silica sol which does not contain organic solvent and can be used even in bulkpolymerization. A monomer compound containing double bond is used as dispersion medium in the silica sol.

Since the silica sol of the present invention does not contain organic solvent, it can be used as a bulk-polymerizable silica-containing monomer, as it is or as its mixture with other double bond containing monomer.

It is apparent also that, in accordance with the present invention, there has been provided a cured resin obtained by polymerizing a composition of silica sol in which at least its dispersion medium is polymerizable.

The cured resin of the present invention not only has resistances against abrasion, staining, solvent and water but also is possessed of heat resistance and dimensional stability against temperature and humidity changes. Also, the cured resin can be applied suitably to optical means especially when an adamantane structure is introduced into the resin.

In the application of the cured resin of the present invention to optical field, it can be used as hard coat agents for optical materials such as plastic lenses, glass lenses, disks and the like, in addition to its ability to give incombustibility because of the presence of silica.

While the present invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claim.

We claim:

1. A polymerizable silica sol comprising a colloidal silica dispersed in a dispersion medium, wherein the dispersion medium comprises:

at least one compound selected from the group consisting of compounds represented by the formulae

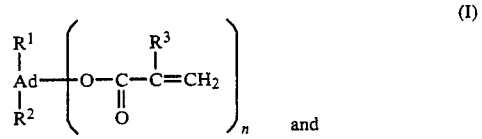

(I)

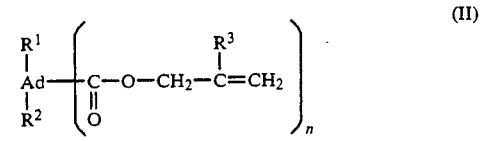

(II)

and wherein Ad is an adamantane group $R^1$ and $R^2$ are independently selected form hydrogen, methyl or ethyl, $R^3$ is hydrogen or methyl and n is an integer of 1 or 2; and at least one compound selected from non-hydroxy containing (meth) acrylate-based monomer.

2. The silica sol of claim 1 wherein the particle size of said colloidal silica is less than or equal to 50 nm.

3. The silica sol of claim 1 wherein said non-hydroxy containing (meth) acrylate-based monomer is at least one compound selected from the group consisting of methyl methacrylate and ethyl acrylate.

4. A polymerizable silica sol comprising a colloidal silica dispersed in a dispersion medium, wherein the dispersion medium comprises:

at least one compound selected from the group consisting of compounds represented by the formulae

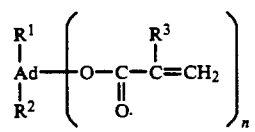
(I)

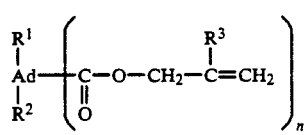
(II)

and

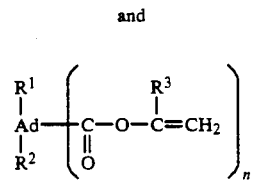
(III)

wherein Ad is an adamantane group, $R^1$ and $R^2$ are independently selected from hydrogen, methyl or ethyl, $R^3$ is hydrogen or methyl and n is an integer of 1 or 2; and at least one hydroxy containing (meth)acrylate-based monomer.

5. The silica sol of claim 4 wherein the particle size of said colloidal silica is less than or equal to 50 nm.

6. The polymerizable silica sol of claim 4 wherein said hydroxy containing (meth)acrylate-based monomer is at least one compound selected from the group consisting of 2-hydroxyethyl acrylate, 2-hydroxyethyl methacrylate and 2-hydroxypropyl methacrylate.

7. The silica sol of claim 1 wherein the dispersion medium further comprises at least one compound selected from monomers having an adamantane structure represented by the formula

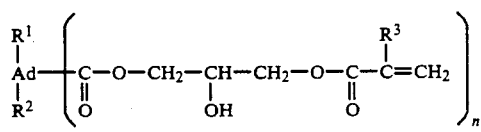
(IV)

wherein Ad, $R^1$, $R^2$, $R^3$ and n are as defined.

8. The silica sol of claim 7 wherein the particle size of said colloidal silica is less than or equal to 50 nm.

9. The silica sol of claim 7 wherein said non-hydroxy containing (meth)acrylatebased monomer is at least one compound selected form the group consisting of methyl methacrylate and ethyl acrylate.

10. A polymerizable silica sol comprising a colloidal silica dispersed in a dispersion medium, wherein th dispersion medium comprises:

at least one compound selected from the group consisting of compound represented by the formulae

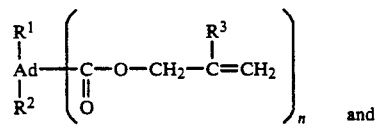
(II)

and

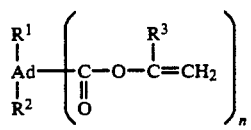
(III)

wherein Ad is an adamantane group, $R^1$ and $R^2$ are independently selected from hydrogen, methyl or ethyl, $R^3$ is hydrogen or methyl and n is an integer of 1 or 2;

at least one non-hydroxy containing (meth)acrylate-based monomer; and at least one hydroxy containing (meth)acrylate-based monomer.

11. The silica sol of claim 10 wherein the particle size of said colloidal silica is less than or equal to 50 nm.

12. The silica sol of claim 10 wherein said non-hydroxy containing (meth)acrylatebased monomer is at least one compound selected from the group consisting of methyl methacrylate and ethyl acrylate.

13. The silica sol of claim 10 wherein said hydroxy containing (meth)acrylate-based monomer is at least one compound selected from the group consisting of 2-hydroxyethyl acrylate, 2-hydroxyethyl methacrylate and 2-hydroxypropyl methacrylate.

14. The silica sol of claim 4 wherein said dispersion medium further comprises at least one compound selected form the monomers having an adamantane structure of the formula

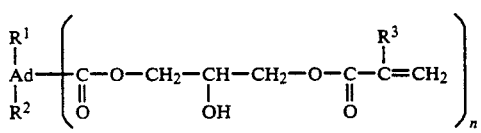
(IV)

wherein Ad, $R^1$, $R^2$, $R^3$ and n are as defined.

15. The silica sol of claim 14 wherein the particle size of said colloidal silica is less than or equal to 50 nm.

16. The silica sol of claim 14 wherein the hydroxy containing (meth)acrylate-based monomer is at least one compound selected from the group consisting of 2-hydroxyethyl acrylate, 2-hydroxyethyl methacrylate and 2-hydroxypropyl methacrylate.

17. The silica sol of claim 10 wherein the dispersion medium further comprises at least one compound having an adamantane structure of the formula

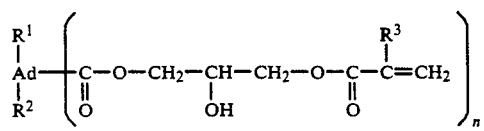
(IV)

wherein Ad, $R^1$, $R^2$, $R^3$ and n are as defined.

18. The silica sol of claim 17 wherein the particle size of said colloidal silica is less than or equal to 50 nm.

19. The silica sol of claim 17 wherein said non-hydroxy containing (meth)acrylatebased monomer is at least one compound selected from the group consisting of methyl methacrylate and ethyl acrylate.

20. The silica sol of claim 17 wherein the hydroxy containing (meth)acrylate-based monomer is at least one compound selected from the group consisting of 2-hydroxyethyl acrylate, 2-hydroxyethyl methacrylate and 2-hydroxypropyl methacrylate.

21. The polymerizable silica sol of claim 1 further comprising at least one silane coupling agent containing a double bond.

22. The polymerizable silica sol of claim 4 further comprising at least one silane coupling agent containing a double bond.

23. The polymerizable silica sol of claim 10 further comprising at least one silane coupling agent containing a double bond.

24. A composition for cured resin use which comprises the silica sol of claim 1 and a polymerization initiator.

25. A composition for cured resin use which comprises the silica sol of claim 4 and a polymerization initiator.

26. A composition for cured resin use which comprises the silica sol of claim 10 and a polymerization initiator.

27. A composition for cured resin use which comprises the silica sol of claim 7 and a polymerization initiator.

28. A composition for cured resin use which comprises the silica sol of claim 14 and a polymerization initiator.

29. A composition for cured resin use which comprises the silica sol of claim 17 and a polymerization initiator.

* * * * *